United States Patent [19]
Gaiser

[11] 3,879,947
[45] Apr. 29, 1975

[54] MASTER CYLINDER RESERVOIR

[75] Inventor: Robert F. Gaiser, St. Joseph, Mich.

[73] Assignee: The Bendix Corporation, South Bend, Ind.

[22] Filed: Dec. 19, 1973

[21] Appl. No.: 426,398

[52] U.S. Cl. .............................................. 60/535
[51] Int. Cl. ........................................... F15b 7/00
[58] Field of Search ................. 60/535, 545, 562; 200/84 R; 340/52 B, 52 C, 59, 244 R, 244 A; 137/265, 558

[56] References Cited
UNITED STATES PATENTS

| | | | |
|---|---|---|---|
| 2,717,935 | 9/1955 | Hartwick | 200/84 R |
| 3,147,596 | 9/1964 | Wallace | 60/562 |
| 3,560,918 | 2/1971 | Lewis et al. | 340/52 C |
| 3,593,271 | 7/1971 | Schrader | 200/84 R |
| 3,603,926 | 9/1971 | Kimura | 340/244 A |
| 3,744,513 | 7/1973 | Leitenberger | 60/562 |

*Primary Examiner*—Martin P. Schwadron
*Assistant Examiner*—H. Burks, Sr.
*Attorney, Agent, or Firm*—Leo H. McCormick, Jr.; William N. Antonis

[57] ABSTRACT

A reservoir for use with a master cylinder in a vehicle having a first compartment separated from a second compartment by a wall. A well located at the axial center of the reservoir is connected by a first channel to the first compartment and by a second channel to the second compartment. A ledge located at the end of each channel and corresponding wing walls prevent a fixed amount of fluid in each compartment from flowing into the well. A sensor located in the well will inform an operator when the quantity of fluid retained in either compartment is insufficient to effectively supply a corresponding pressurizing piston in the master cylinder with sufficient fluid to operate the wheel brakes of the vehicle.

12 Claims, 3 Drawing Figures

MASTER CYLINDER RESERVOIR

BACKGROUND OF THE INVENTION

The interior of the reservoir used to supply a master cylinder with hydraulic fluid to operate the front wheel brakes and the rear wheel brakes is usually divided by a wall. The position of the wall with respect to the housing of the reservoir can be varied to account for different displacements required for operating the front and rear brakes. This wall has been used as a separator for isolating the supply chamber for the front wheel brakes from the rear wheel brakes.

Recent safety standards set forth by the Department of Transportation include requirements for fixed volume of fluid retention, accuracy in fluid level indication, and complete separation of communication of the chambers when the fixed volume of fluid is reached.

In U.S. Pat. No. 3,149,468, it is shown how a wall of a fixed height can separate the front chamber from the rear chamber. However, when a sensor, as disclosed in U.S. Pat. No. 3,603,926 was installed in the wall, false level indications can occur when a roadway slopes, that is, when the road surface deviates from a horizontal and/or vertical plane. In addition, upon rapid acceleration and deceleration this false level indication is intensified by the fluid stacking up against the retention walls.

In U.S. Pat. No. 3,147,596 the effect of stacking on the level indication was avoided by placing a horizontal wall or shelf on the vertical wall to retain the fluid in each chamber during acceleration or deceleration. However, a separate sensor for each chamber would be required in order to indicate the fluid level in the reservoir. In addition, during rapid acceleration the shelf retention would contribute to the false level indication.

SUMMARY OF THE INVENTION

I have devised a reservoir for holding fluid to be used by a master cylinder supplying the front wheel brakes and the rear wheel brakes of a vehicle with pressurized fluid in response to an operational input. The housing of the reservoir is divided by a wall. The wall has a well located at the axial center of the housing. Channel means extended from the well into a first compartment which supplies the front wheels and a second compartment which supplies the rear wheels communicates fluid into the well. A ledge located in each compartment adjacent the channel means limits the communication of fluid from the compartment when a fixed volume is reached. A single sensor means located in the well means will be unaffected by movement of the housing away from a horizontal plane since the fluid level at the axial center is unaffected by such movement. When the housing is rotated through a fixed angle, the ledge in either compartment will prevent further communication of fluid through the channel means into the well means. The sensor means will then produce a signal indicating a possible deficiency in fluid to effectively operate the wheel brakes and the operator should take appropriate measures to correct or minimize the affect of this deficiency.

It is therefore an object of this invention to provide a master cylinder with reservoir means having a separate compartment for retention of operational fluid with a single sensor means to accurately indicate fluid level during acceleration and while traveling on sloping roadways.

It is a further object of this invention to provide a reservoir for a master cylinder with channel means for communicating fluid from separate compartments to a sensor means to give an accurate fluid level indication upon rotation of the housing.

It is another object to provide a compartment of a reservoir with barrier means to limit the communication through a channel to a level indicator upon rotation of the reservoir.

These and other objects will become apparent from reading the specification and viewing the drawings.

DETAILED DESCRIPTION OF THE PREFERRED EMBODIMENT

Figure 1:
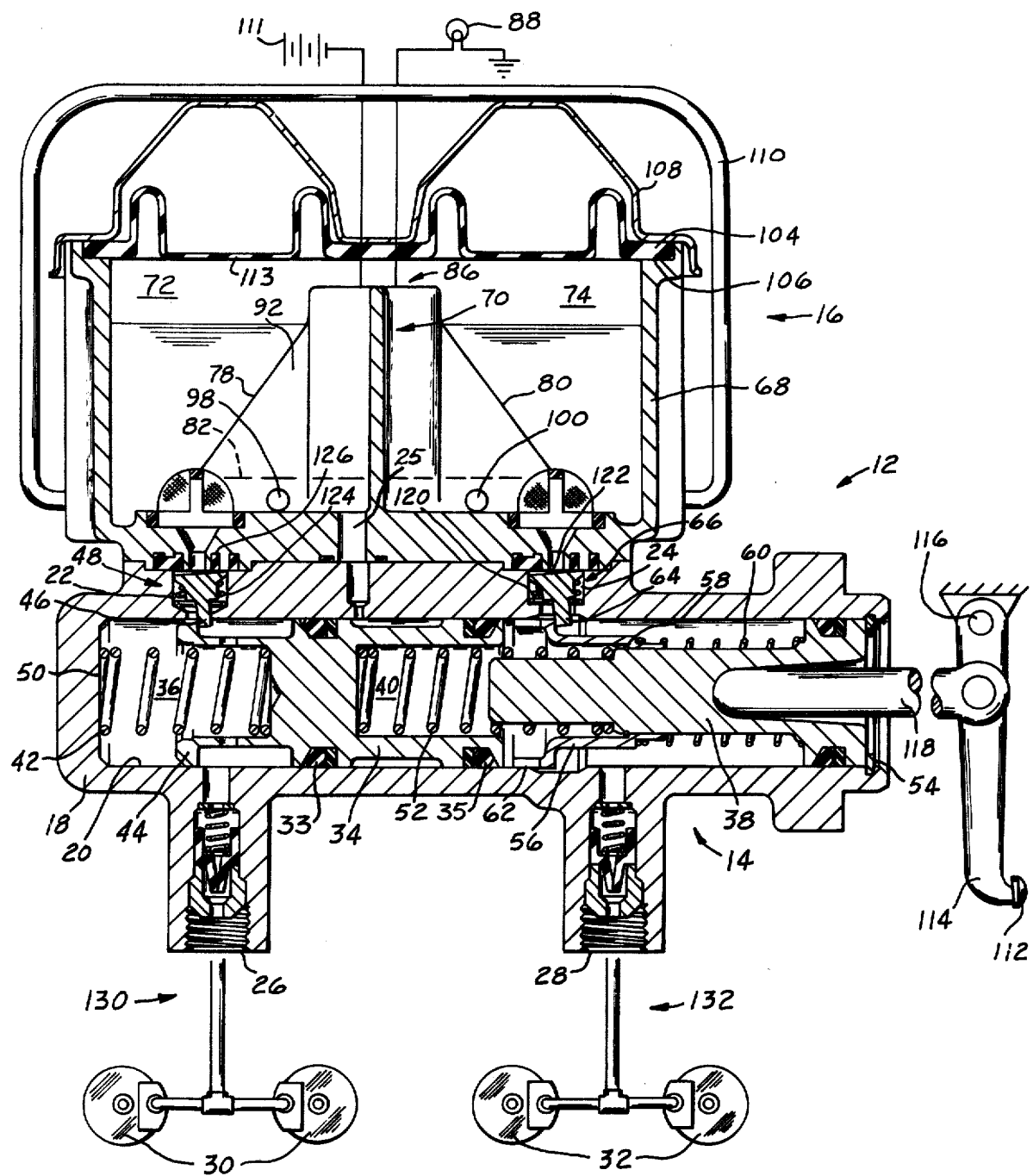
FIG. 1 is a sectional view of a master cylinder apparatus for use in a braking system of a vehicle.

The master cylinder apparatus 12, shown in FIG. 1 for use in a vehicle, has a fluid pressurizing means 14 and a reservoir means 16.

The fluid pressurizing means 14 has a housing 18 with a bore 20 therein. The bore 20 has a first port 22 and a second port 24 through which fluid communication from the reservoir means 16 is established and a third port 26 and a fourth port 28 through which pressurized fluid is communicated to the front wheel brakes 30 and the rear wheel brakes 32.

A first piston 34 is located in the bore 20 to establish a first pressurizing chamber 36 with the housing 18 and bottom 50 of the bore 20. A second piston 38 is located in the bore 20 and with the first piston 34 establishes a second chamber 40 therein. A first spring 42 located between the bottom 50 of the bore 20 and the first piston 34 holds rib 44 against stem 46 of the tilt valve means 48 to permit fluid to be communicated through the first port 22 into the first chamber 36. A second spring 52 located between the first piston 34 and the second piston 38 holds the second piston 38 against stop 54. A sleeve 56 concentric to the second piston 38 is held against snap ring 58 by spring 60. A guide surface 62 on the sleeve 56 engages stem 64 of the tilt valve means 66 to permit fluid to be communicated into the second chamber 40 through the second port 24.

The tilt valve means 48 and 66 utilized to control the fluid communication between the reservoir means 16 and the fluid pressurizing means 14 are fully disclosed in U.S. Patent Application Ser. No. 204,550, incorporated herein by reference.

Figure 2:
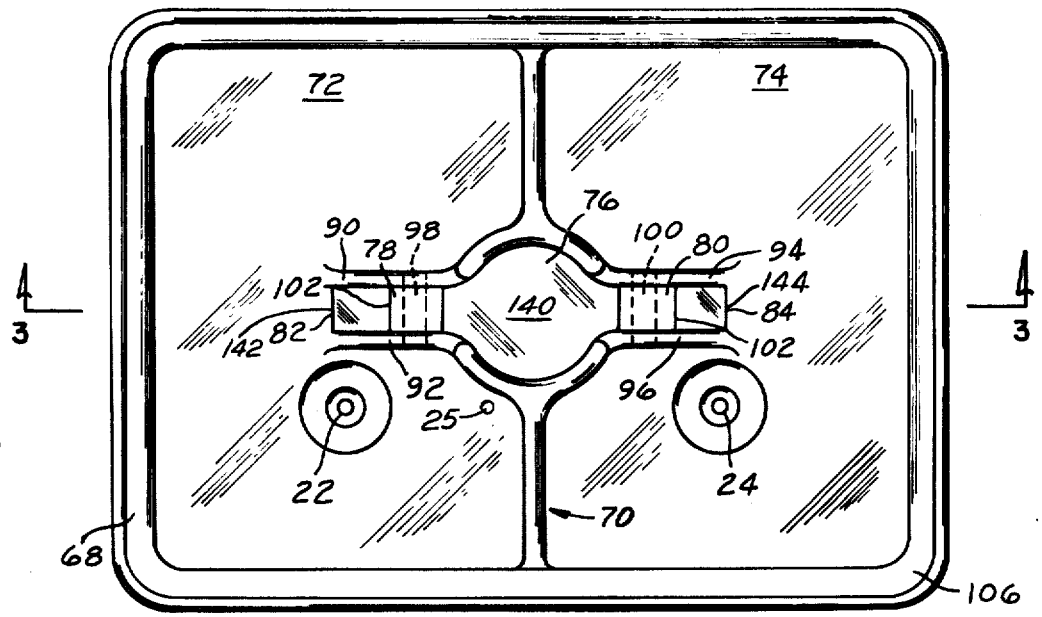
FIG. 2 is a view of the reservoir taken along line 2—2 of FIG. 3.
Figure 3:
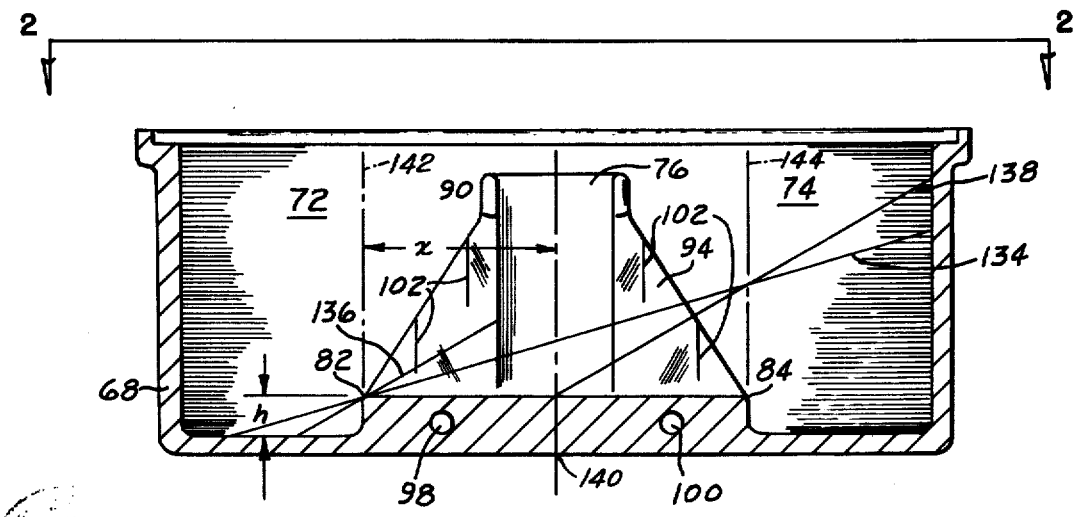
FIG. 3 is a view taken along line 3—3 of FIG. 2.

The reservoir means 16 includes a housing 68 having a chamber therein divided by a wall means 70 into a first compartment 72 and a second compartment 74. The wall means 70 has a well 76 (see FIGS. 2 and 3) which is located on the axial center of the housing 68. The well 76 is connected to the first compartment by a first channel 78 and to the second compartment by a second channel 80. A first ledge 82 is located at the axial center of the first compartment 72 and a second ledge 84 is located at the axial center of the second compartment 74 to establish a fixed volumetric level at which communication of fluid to the well 76 will be interrupted. A sensor 86, not shown, similar in operation to that described in U.S. Pat. No. 3,603,926, is located in the axial center of well 76. The fluid level at the axial center of the well 76 will be substantially unaffected due to movement of housing 68 with respect to horizontal and vertical plane changes caused by the slope of the roadway on which the vehicle is traveling. Upon interruption of fluid to the well 76, sensor means 86 will send a signal to operate light 88 and inform an operator that an insufficient quantity of operational fluid is present in the housing 68. First and second wing walls 90 and 92 extend from the first ledge 82 to the well 72 to form the perimeter for the first channel 78. Third and fourth wing walls 94 and 96 extend from the second ledge 84 to the well 72 to form the perimeter for the second channel 80.

A passageway 98 located in the housing 68 under the ledge 82 will assure that fluid in the first compartment is not isolated on one side of the channel 78 upon rotation of the master cylinder 14 about its axis. Similarly, passageway 100 located under ledge 84 will allow total fluid communication in the second compartment 74. A series of baffles 102 located in the first and second channels will prevent rapid communication of the fluid to the well.

A bead 104 on a diaphragm 113 fits into a groove 106 adjacent the top of the housing 68. A cap 108 covers the housing 68 and holds the bead 104 in a fixed position in the groove 106. A bail wire 110 attached to the housing 68 resiliently applies pressure to the cap 108 to seat the bead 104 in a seal relationship with respect to the housing 68.

MODE OF OPERATION OF THE PREFERRED EMBODIMENT

In the brake release position, as shown in FIG. 1, fluid in the first compartment 72 will flow through the first port 22 into the first chamber 36 and in the second compartment 74 through the second port 24 into the second chamber 40. The first and second channels 78 and 80, respectively, will communicate fluid into the well 70. The sensor means 86 will be responsive to the fluid level in the well and prevent current from source 111 from energizing indicator means 88.

When an operator wishes to bring the vehicle to a stop, an input force is applied to foot pedal 112 which will pivot arm 114 on pin 116. As arm 114 pivots on pin 116, push rod 118 will exert a corresponding actuation force on the second piston 38. This actuation force will initially move the second piston 38. Spring 60 will simultaneously move sleeve 56 with the second piston to permit spring 120 to seat stem 64 on seal 122 and interrupt communications between the second compartment 74 and second chamber 40. Further movement of the push rod 118 will move the piston 38 to pressurize the fluid in chamber 40. The fluid under pressure in chamber 40 will act on the first piston 34 and be transmitted through the fourth port 28 to begin to operate the wheel brakes 32. The fluid pressure acting on the first piston 34 will overcome spring 42 to permit spring 124 to seat stem 46 on seal 126 and interrupt communications between the first compartment 72 and the first chamber 36. Vent port 25 will allow fluid in the first compartment 72 to flow into bore 20 between seals 33 and 35 to permit the first piston to freely move in response to the actuation force from the second piston 38. In addition if either seal 33 or 35 fails, the fluid pressure build up in chamber 36 or 40 will be transmitted into the first chamber through vent port 25 to assure actuation of a pressure differential switch (not shown) to inform the operator an inadequate braking condition is present in brake system. Additional input force on the push rod 118 will simultaneously move both the first and second pistons to pressurize the hydraulic fluid in the first compartment 36 and the second compartment 40 to uniformly operate the wheel brakes 30 and 32.

When the input force on pedal 112 is released springs 42 and 52 will move the first piston 34 and the second piston 38 to the rest position where fluid communication is restored between the first compartment 72 and second compartment 74.

During rapid deceleration the reservoir means 16 will rotate about its center of gravity 140 or central axis while the fluid at that point will remain in a horizontal plane. The maximum slope or angle of rotation through which communication between the first compartment 72 and the second compartment 74 will exist is illustrated by line 134. The slope on this angle, which is also the maximum roadway slope, is equal to the tangent of the angle derived by dividing the ledge height "H" by the distance $x$, see FIG. 3, measured between the center of gravity 140 of the reservoir and either the center of gravity 142 or 144 of compartment 72 or 74, respectively. By varying the ledge height "$h$" it is possible to estimate the type of terrain on which a vehicle equipped with reservoir means 16 can effectively operate without adversely developing a false fluid level indication. If either the first wheel brake system 130 or the second wheel brake system 132 develops a leak, after repeated brake applications the fluid in the chamber supplying the wheel brake will be depleted. Assume the second wheel brake system 132 develops a leak such that the fluid in chamber 72 is being depleted by flowing through channel 78 into well 76 out channel 80 into chamber 74. When the slope on the terrain on which the vehicle is traveling approaches that of line 134, ledge 82 will prevent the flow of fluid from chamber 72 into the channel 78. Wing walls 90 and 92 will retain the fluid in chamber 72 as the reservoir means 16 is further rotated when the vehicle is traveling on a still steeper sloped terrain such as that illustrated by line 136. At this time the fluid in the second chamber 74 will have assumed a surface slope with respect to housing 68 approaching line 138, such that sensor 86 will activate light 88 informing the operator of a low fluid level in the reservoir means 16. Passageway 98 will provide a communication path for the fluid through the ledge to avoid isolation of any fluid within the compartment 72, assuring a sufficient quantity of fluid to supply the first piston 34 during an operational braking condition.

I claim:

1. In a master cylinder connected to a first wheel brake system and a second wheel brake system, reservoir means for supplying said first and second wheel brake systems with fluid to be pressurized in response to a brake applying force, said reservoir means comprising:

a housing having a chamber therein, wall means for separating the chamber into a first compartment and a second compartment, each of said first and second compartments retaining a quantity of said fluid, said wall means having a well therein located at the center of gravity of said housing;

channel means located in the first compartment and the second compartment for directing the fluid contained therein into said well;

ledge means associated with said channel means and located at the center of gravity of each of said first and second compartments, said ledge means preventing a fixed quantity of fluid from entering said well when said master cylinder is rotated about said center of gravity to assure sufficient fluid is present in the master cylinder to supply at least one of said first and second wheel brake systems; and wing walls extending from said ledge means to the wall means for preventing said fluid from entering the channel after the master cylinder has rotated about its center of gravity through an angle whose tangent is equal to the height of the ledge divided by the distance between the center of gravity of the housing and one of the first and second compartments.

2. The master cylinder, as recited in claim 1, wherein said wall means includes:

baffle means located in the flow path of said fluid to impede the flow of the fluid into said well to avoid presenting said sensor with misinformation during rapid deceleration on a sloping roadway.

3. The master cylinder, as recited in claim 1, wherein said sensor means includes:

readout means for informing an operator when the fluid level in the first and second compartments reaches the ledge height.

4. A reservoir means for use with a master cylinder in a vehicle, said reservoir supplying the master cylinder with a fluid to operate a first brake system and a second brake system in the vehicle, said reservoir means comprising:

a housing having a chamber therein, said chamber having a first port connected to the first brake system and a second port connected to the second brake system;

wall means for dividing said chamber into a first compartment and a second compartment, said first compartment and said second compartment retaining said fluid;

well means located at the axial center of said housing;

channel means located in said first compartment and said second compartment for communicating said fluid contained therein into said well means;

ledge means associated with said channel means for establishing a barrier for retaining said fluid in one of said compartments during a rotation of said master cylinder away from a horizontal plane; and sensor means located in said well means for indicating the level of fluid therein, said ledge means preventing a fixed quantity of fluid from entering said well means during rotation of the housing about said axial center to assure that sufficient fluid is present in one of said first and second compartments for operating the corresponding brake system.

5. The reservoir means, as recited in claim 4, wherein said channel means further includes:

wing wall means located in each compartment extending from said ledge means to said well means for preventing fluid from entering said channel means after the housing has rotated an angle whose tangent is equal to the height of the ledge means divided by one-half of the distance between said axial center and the housing.

6. The reservoir, as recited in claim 4, wherein said housing includes:

passageways perpendicularly located in said channel means for providing total communication of the fluid in each compartment with the associated port upon rotation about the axial center.

7. The reservoir, as recited in claim 1, wherein said housing includes:

passageways perpendicularly located in said channel means for providing total communication of the fluid in each compartment with the associated port upon rotation about the axial center.

8. The master cylinder, as recited in claim 4, wherein said wall means includes:

baffle means located in the flow path of said fluid to impede the flow of the fluid into said well to avoid presenting said sensor with misinformation during rapid deceleration on a sloping roadway.

9. The master cylinder, as recited in claim 4, wherein said sensor means includes:

readout means for informing an operator when the fluid level in the first and second compartments reaches the ledge height.

10. The reservoir means, as recited in claim 4, wherein said wall means includes:

baffle means located in the channel means to impede the flow of the fluid into the well means to avoid presenting said sensor with misinformation during rapid deceleration on a sloping roadway.

11. A reservoir means for use with a master cylinder in a vehicle, said reservoir supplying the master cylinder with a fluid to operate a first brake system and a second brake system in the vehicle, said reservoir means comprising:

a housing having a chamber therein, said chamber having a first port connected to the first brake system and a second port connected to the second brake system;

wall means for dividing said chamber into a first compartment and a second compartment, said first compartment and said second compartment retaining said fluid;

well means located at the axial center of said housing;

channel means located in said first compartment and said second compartment for communicating said fluid contained therein into said well means;

ledge means associated with said channel means for establishing a barrier for retaining said fluid in one of said compartments during movement of the master cylinder away from a horizontal plane; and sensor means associated with said well means for indicating the level of fluid therein, said ledge means preventing a fixed quantity of fluid from entering said well means during rotation of the housing about said axial center to assure that sufficient fluid is present in one of said first and second compartments for operating the corresponding brake system.

12. The reservoir means, as recited in claim 11, wherein said channel means further includes:

wing wall means located in each compartment extending from said ledge means to said well means for preventing fluid from entering said channel means after the housing has rotated an angle whose tangent is equal to the height of the ledge means divided by one-half of the distance between said axial center and the housing.

* * * * *